(12) United States Patent
Murai

(10) Patent No.: US 8,934,482 B2
(45) Date of Patent: Jan. 13, 2015

(54) APPARATUS AND METHOD FOR CONTROLLING COMMUNICATION, AND COMPUTER PROGRAM PRODUCT

(75) Inventor: Shinya Murai, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 2206 days.

(21) Appl. No.: 11/212,701

(22) Filed: Aug. 29, 2005

(65) Prior Publication Data

US 2006/0067310 A1 Mar. 30, 2006

(30) Foreign Application Priority Data

Sep. 24, 2004 (JP) ................................. 2004-278262

(51) Int. Cl.
  *H04L 12/16* (2006.01)
  *H04Q 11/00* (2006.01)
  *H04L 29/08* (2006.01)
(52) U.S. Cl.
  CPC ............... *H04L 67/16* (2013.01); *H04L 67/30* (2013.01)
  USPC ........................................................ 370/353
(58) Field of Classification Search
  USPC ......................................... 370/351, 352–356
  See application file for complete search history.

(56) References Cited

U.S. PATENT DOCUMENTS

| 5,887,136 | A | 3/1999 | Yasuda et al. | |
|---|---|---|---|---|
| 2004/0163073 | A1* | 8/2004 | Krzyzanowski et al. | 717/107 |
| 2005/0141529 | A1* | 6/2005 | Miyajima et al. | 370/401 |
| 2005/0226264 | A1* | 10/2005 | Toyoda | 370/352 |

FOREIGN PATENT DOCUMENTS

| JP | 3-173249 | 7/1991 |
|---|---|---|
| JP | 08-331124 A2 | 12/1996 |
| JP | 2001-7856 | 1/2001 |
| JP | 2001-177665 | 6/2001 |
| JP | 2004-54822 | 2/2004 |

(Continued)

OTHER PUBLICATIONS

U.S. Appl. No. 11/232,893, filed Sep. 23, 2005, to Yamaguchi et al.

(Continued)

*Primary Examiner* — Nafiz E Hoque
(74) *Attorney, Agent, or Firm* — Finnegan, Henderson, Farabow, Garrett & Dunner, L.L.P.

(57) ABSTRACT

A communication control apparatus includes a storing unit that stores terminal information including respective identifiers of a plurality of communication terminals, respective user identifiers, and respective media types, each media type indicating data format processed by each communication terminal. The apparatus also includes a selecting unit that selects second and third communication terminals which satisfy a connection request called from a first communication terminal, as a result of comparison of the terminal information with a user identifier and a media type; a first communication unit that transmits information identifying the third communication terminal to the second communication terminal, and receives information identifying the third communication terminal to be connected with the first communication terminal from the second communication terminal; a second communication unit that transmits the connection request to the third communication terminal; and a third communication unit that requests the first communication terminal to connect to the third communication terminal.

8 Claims, 10 Drawing Sheets

| COMMUNICATION DEVICE IDENTIFIER | USER IDENTIFIER | MEDIA TYPE | INPUT/OUTPUT TYPE | POSITIONAL INFORMATION | USE CONDITION |
|---|---|---|---|---|---|
| 1 | USER A | AUDIO X | INPUT/OUTPUT ALLOWED | ROOM A | SHARING NOT ALLOWED |
| 2 | USER A | AUDIO X | INPUT/OUTPUT ALLOWED | ROOM A | SHARING NOT ALLOWED |
| 3 | USER B | AUDIO X·VIDEO Y | INPUT/OUTPUT ALLOWED | ROOM B | SHARING NOT ALLOWED |
| 4 | Any | VIDEO Y | OUTPUT ALLOWED | ROOM A | NO CONDITION |
| 5 | Any | VIDEO Y | INPUT ALLOWED | ROOM B | 4 OR 6 NECESSARY |
| 6 | Any | VIDEO Y | OUTPUT ALLOWED | ROOM B | 3 NECESSARY |
| 7 | Any | AUDIO X | INPUT/OUTPUT ALLOWED | ROOM B | NO CONDITION |

(56) References Cited

FOREIGN PATENT DOCUMENTS

| | | | | |
|---|---|---|---|---|
| JP | 2006-523982 | 10/2006 | | |
| WO | WO 00/41406 | 7/2000 | | |
| WO | WO 2005/064958 | * 7/2005 | ............... | H04Q 7/22 |

OTHER PUBLICATIONS

Office Action issued by the Japanese Patent Office on Jun. 5, 2007, for Japanese Patent Application No. 2004-278262, and partial English-language translation thereof.

* cited by examiner

FIG.3

| COMMUNICATION DEVICE IDENTIFIER | USER IDENTIFIER | MEDIA TYPE | INPUT/OUTPUT TYPE |
|---|---|---|---|
| 1 | USER A | AUDIO X | INPUT/OUTPUT ALLOWED |
| 2 | USER A | AUDIO X | INPUT/OUTPUT ALLOWED |
| 3 | USER B | AUDIO X·VIDEO Y | INPUT/OUTPUT ALLOWED |
| 4 | Any | VIDEO Y | OUTPUT ALLOWED |
| 5 | Any | VIDEO Y | INPUT ALLOWED |
| 6 | Any | VIDEO Y | OUTPUT ALLOWED |

301

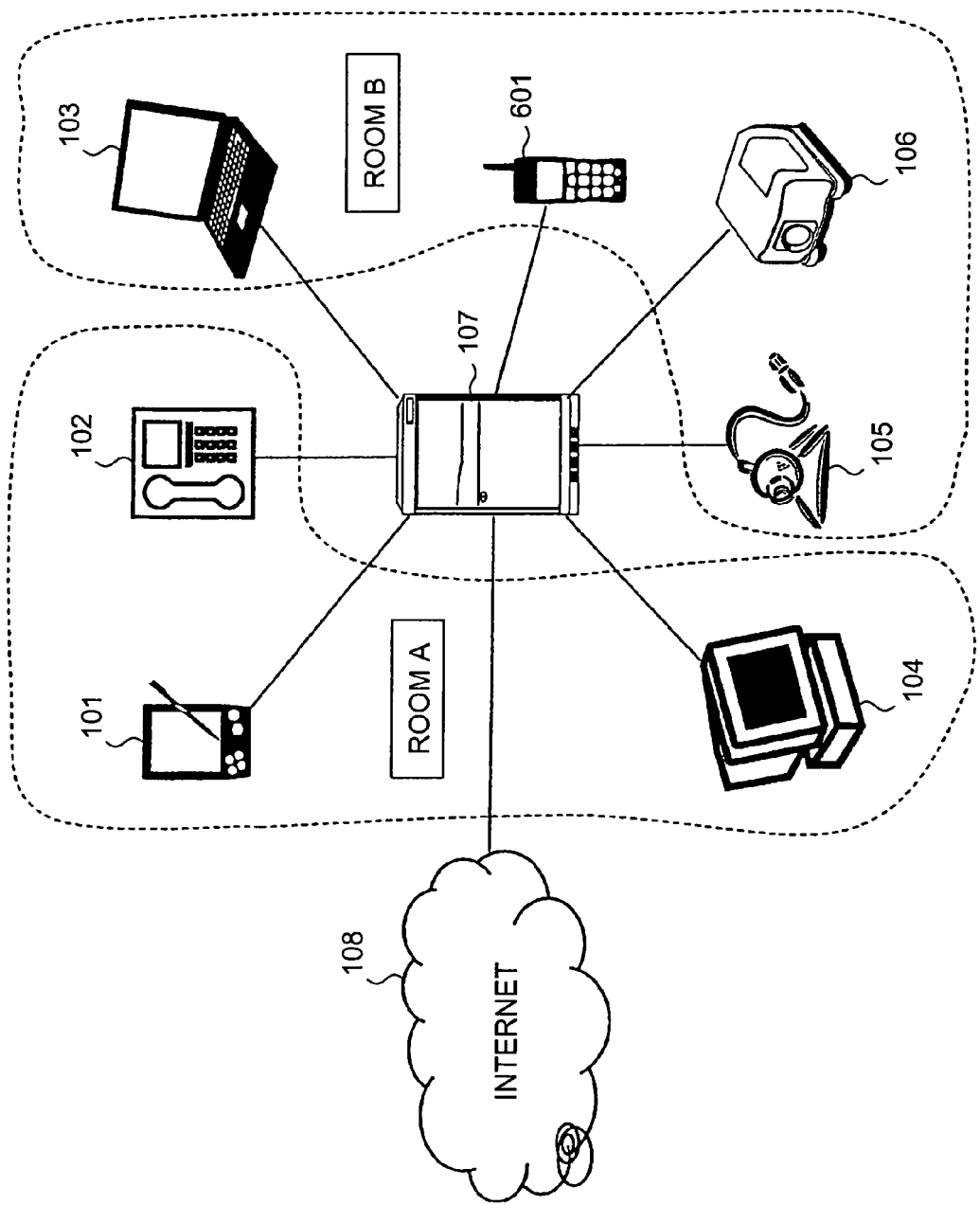

FIG.7

| COMMUNICATION DEVICE IDENTIFIER | USER IDENTIFIER | MEDIA TYPE | INPUT/OUTPUT TYPE | POSITIONAL INFORMATION |
|---|---|---|---|---|
| 1 | USER A | AUDIO X | INPUT/OUTPUT ALLOWED | ROOM A |
| 2 | USER A | AUDIO X | INPUT/OUTPUT ALLOWED | ROOM A |
| 3 | USER B | AUDIO X·VIDEO Y | INPUT/OUTPUT ALLOWED | ROOM B |
| 4 | Any | VIDEO Y | OUTPUT ALLOWED | ROOM A |
| 5 | Any | VIDEO Y | INPUT ALLOWED | ROOM B |
| 6 | Any | VIDEO Y | OUTPUT ALLOWED | ROOM B |
| 7 | Any | AUDIO X | INPUT/OUTPUT ALLOWED | ROOM B |

| COMMUNICATION DEVICE IDENTIFIER | USER IDENTIFIER | MEDIA TYPE | INPUT/OUTPUT TYPE | POSITIONAL INFORMATION | USE CONDITION |
|---|---|---|---|---|---|
| 1 | USER A | AUDIO X | INPUT/OUTPUT ALLOWED | ROOM A | SHARING NOT ALLOWED |
| 2 | USER A | AUDIO X | INPUT/OUTPUT ALLOWED | ROOM A | SHARING NOT ALLOWED |
| 3 | USER B | AUDIO X · VIDEO Y | INPUT/OUTPUT ALLOWED | ROOM B | SHARING NOT ALLOWED |
| 4 | Any | VIDEO Y | OUTPUT ALLOWED | ROOM A | NO CONDITION |
| 5 | Any | VIDEO Y | INPUT ALLOWED | ROOM B | 4 OR 6 NECESSARY |
| 6 | Any | VIDEO Y | OUTPUT ALLOWED | ROOM B | 3 NECESSARY |
| 7 | Any | AUDIO X | INPUT/OUTPUT ALLOWED | ROOM B | NO CONDITION |

| COMMUNICATION DEVICE IDENTIFIER | USER IDENTIFIER | MEDIA TYPE | INPUT/OUTPUT TYPE | POSITIONAL INFORMATION | USER |
|---|---|---|---|---|---|
| 1 | USER A | AUDIO X | INPUT/OUTPUT ALLOWED | ROOM A | USER A |
| 2 | USER A | AUDIO X | INPUT/OUTPUT ALLOWED | ROOM A | USER A |
| 3 | USER B | AUDIO X·VIDEO Y | INPUT/OUTPUT ALLOWED | ROOM B | USER B |
| 4 | Any | VIDEO Y | OUTPUT ALLOWED | ROOM A | AVAILABLE |
| 5 | Any | VIDEO Y | INPUT ALLOWED | ROOM B | USER B |
| 6 | Any | VIDEO Y | OUTPUT ALLOWED | ROOM B | USER B |
| 7 | Any | AUDIO X | INPUT/OUTPUT ALLOWED | ROOM B | AVAILABLE |

901

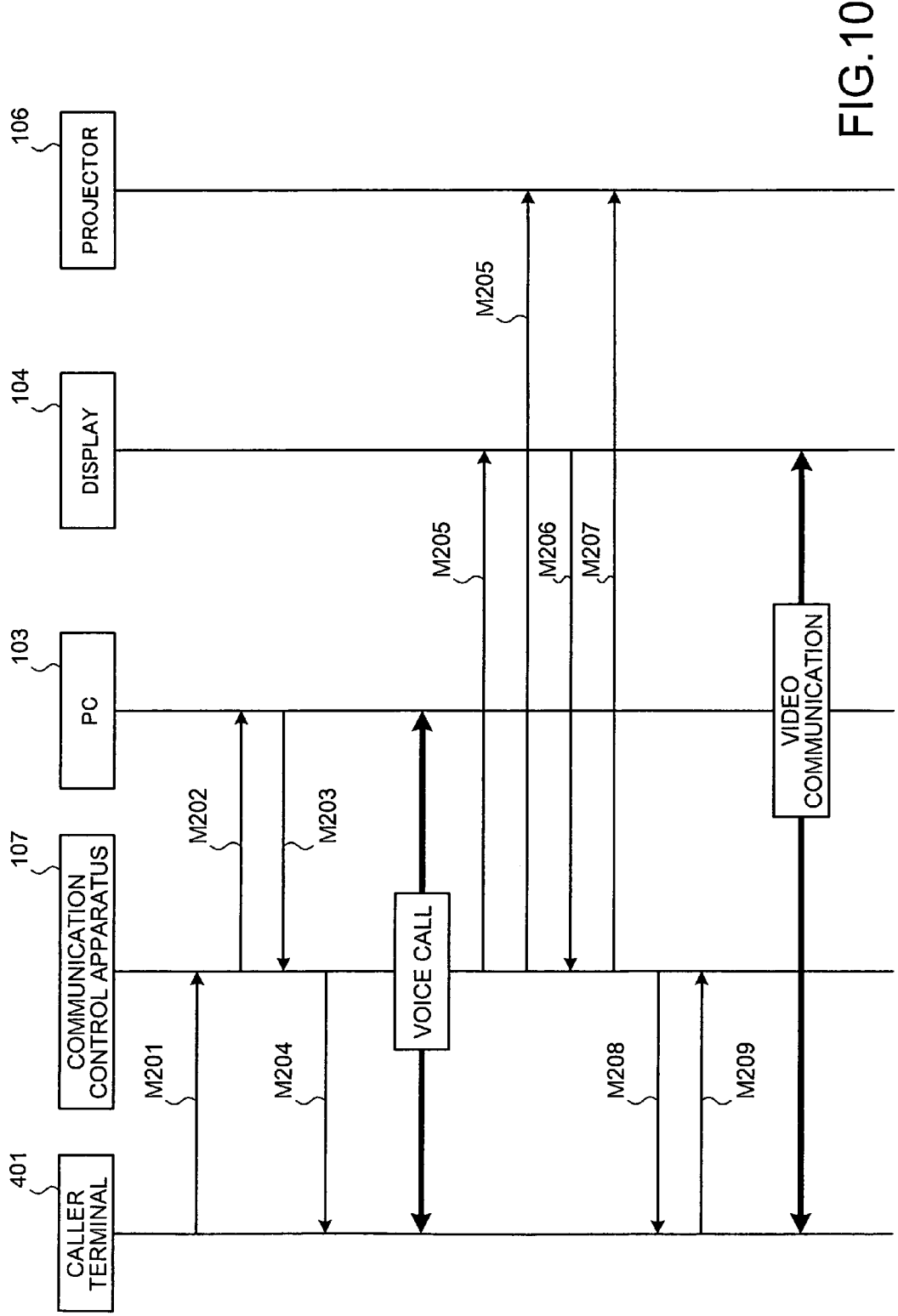

APPARATUS AND METHOD FOR CONTROLLING COMMUNICATION, AND COMPUTER PROGRAM PRODUCT

CROSS-REFERENCE TO RELATED APPLICATIONS

This application is based upon and claims the benefit of priority from the priority Japanese Patent Application No. 2004-278262, filed on Sep. 24, 2004; the entire contents of which are incorporated herein by reference.

BACKGROUND OF THE INVENTION

1. Field of the Invention

The present invention relates to a communication system where a communication terminal sends a connection request for establishment of a connection, and more particularly to a method of selecting a communication terminal among plural communication terminals when there are plural connectable communication terminals.

2. Description of the Related Art

In recent years, real-time communication, where a user can make a call whenever he/she wants to communicate on real-time, becomes increasingly diversified. The diversification of real-time communication technologies is realizing various applications. For example, the users of TV telephones can send not only the sounds which can be sent via a conventional telephone but also video via the TV telephones. The real-time communication, in addition to such applications, is realizing free exchanges of audio, video, and other data on an Internet Protocol (IP) network.

Together with the deepening diversification of technology, various communication terminals are developed. Today, employable communication terminals are not only dedicated terminals such as conventional telephones used exclusively for the voice call, but also general-purpose devices such as personal computers. Further with the diversification in transmitted information, it appears to be more convenient if each of various types of information is handled with a separate communication terminal among plural communication terminals. With such process sharing, dedicated terminal (e.g., a dedicated TV telephone) provided exclusively for each type of communication such as a TV call, becomes unnecessary. Then, the user may be able to prepare plural communication terminals with suitable functions, and on receiving a call, make a selection from the plural communication terminals as appropriate according to an environment (for example, the user may choose a conventional telephone and a portable personal digital assistant (PDA)).

When processing of various pieces of information is required and the users have choices of plural communication terminals as candidate tools to be employed at answering a call, the user may find it more convenient if he/she can choose one or more of the provided communication terminals for each call. In addition, since the user does not always stay at a predetermined location nor carry a predetermined set of communication terminals at a time of call, a system should be provided where the user can select the communication terminal(s) to use for each call.

However, if there are too many selectable candidate communication terminals, such selection creates a considerable workload and significantly delays the eventual establishment of connection for the call. In addition, when there are too many selectable candidate communication terminals, the user may find it difficult to select he/she really wants to use.

For example, Japanese Patent Application Laid-Open No. 08-331124 discloses an apparatus to automatically secure a necessary communication bandwidth corresponding to a communication terminal which is used by a participant of a television conference.

When the connection needs to be established with the caller communication terminal, the user him/herself needs to perform a predetermined operation to select a communication terminal to be connected from plural candidate communication terminals. Hence significant time and workload are required until an eventual establishment of the call.

SUMMARY OF THE INVENTION

According to one aspect of the present invention, a communication control apparatus includes a storing unit that stores terminal information including respective identifiers of a plurality of communication terminals, respective user identifiers of the communication terminals, and respective media types of the communication terminals, each media type indicating data format processed by each communication terminal; a selecting unit that selects a second communication terminal and a third communication terminal which satisfy a connection request called from a first communication terminal, as a result of comparison of the terminal information with a user identifier and a media type which are included in the connection request; a first communication unit that transmits information identifying the third communication terminal to the second communication terminal, and receives information identifying the third communication terminal to be connected with the first communication terminal from the second communication terminal; a second communication unit that transmits the connection request to the third communication terminal identified by the information received by the first communication unit; and a third communication unit that requests the first communication terminal to connect to the third communication terminal.

According to another aspect of the present invention, a communication control apparatus includes a storing unit that stores terminal information including respective identifiers of a plurality of communication terminals, respective user identifiers of the communication terminals, and respective media types of the communication terminals, each media type indicating data format processed by each communication terminal; a selecting unit that selects a second communication terminal which satisfies a connection request called from a first communication terminal, as a result of comparison of the terminal information with a user identifier and a media type which are included in the connection request; a first communication unit that transmits the connection request to the second communication terminal; and a second communication unit that requests the first communication terminal to connect to the second communication terminal.

According to still another aspect of the present invention, a communication control method includes selecting a second communication terminal and a third communication terminal which satisfy a connection request called from a first communication terminal, as a result of comparison of terminal information with a user identifier and a media type which are included in the connection request, the terminal information being stored in advance, the terminal information including respective identifiers of a plurality of communication terminals, respective user identifiers of the communication terminals, and respective media types of the communication terminals, each media type indicating data format processed by each communication terminal; transmitting a list indicating the third communication terminal to the second communication terminal; receiving a connection response from the third communication terminal; transmitting the connection request to the third communication terminal; and requesting the first communication terminal to connect to the third communication terminal.

A computer program product according to still another aspect of the present invention causes a computer to perform the communication control method according to the present invention.

BRIEF DESCRIPTION OF THE DRAWINGS

FIG. 3 is a diagram of an example of a terminal information table according to the first embodiment;

FIG. 6 is a diagram of an example of a structure of a real-time communication system according to a second embodiment;

FIG. 7 is a diagram of an example of a terminal information table according to the second embodiment;

FIG. 8 is a diagram of an example of a modification of the terminal information table of the second embodiment;

FIG. 9 is a diagram of another example of a modification of the terminal information table of the second embodiment; and FIG. 10 is a diagram of an example of a sequence of a real-time communication system according to a third embodiment.

DETAILED DESCRIPTION OF THE PREFERRED EMBODIMENTS

Figure 1:
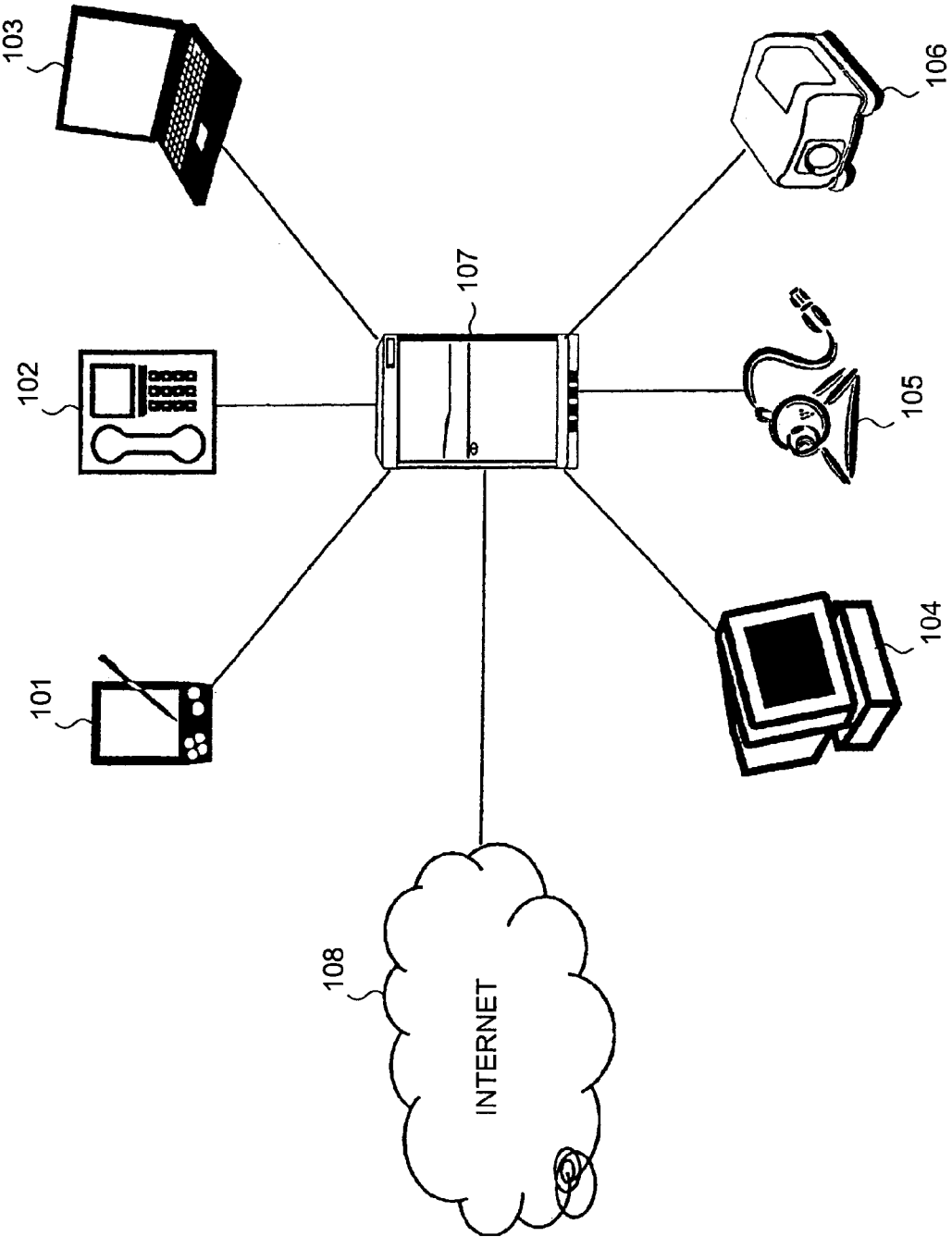
FIG. 1 is a diagram of an example of a structure of a real-time communication system according to a first embodiment.

FIG. 1 is a diagram of an example of a structure of a real-time communication system according to a first embodiment. In FIG. 1, a portable terminal 101, a telephone machine 102, a personal computer (PC) 103, a display 104, a camera 105, a projector 106, a communication control apparatus 107, and an internet 108 are shown.

The portable terminal 101 is a portable communication terminal such as a personal digital assistant (PDA). The portable terminal 101 has a liquid crystal display to display an image, and a tool such as a button or a pen-like input device to allow user's manipulation. Further, the portable terminal 101 can exchange audio data with other communication terminal via a network.

The telephone machine 102 is a telephone which can exchange audio data with other communication terminal via a network, and has a function of an Internet Protocol (IP) telephone, for example.

The PC 103 is a portable personal computer provided with a display, a keyboard, and a pointer. The PC 103 can be connected to other communication terminal via the network. The PC 103 can exchange data in a format of audio data, and video data. Further, the PC 103 can execute various applications, and the user can perform a predetermined operation by typing on the keyboard while looking at the display. The PC 103 can be a desk-top type personal computer as far as it can be connected to the network.

The display 104 has a function of displaying video data received via the network on a cathode ray tube (CRT) or a liquid crystal panel. The display 104 can receive data in a format of video data via the network.

The camera 105 incorporates a charge-coupled device (CCD) camera, for example, and is capable of picking up a surrounding image as video. The camera 105 can supply the picked-up video data as an output to other communication terminal via the network. The camera 105 can handle the video data alone and basically does not have a function to receive data as an input.

The projector 106 has a function of projecting (displaying) video data received via the network on a screen. The projector 106 can handle the video data alone, and basically does not have a function to supply the data as an output.

The communication control apparatus 107 receives a call directly from a communication terminal or via the internet 108, and sends information on connectable communication terminal(s) in response to the call to a predetermined communication terminal(s) via the network. Further, the communication control apparatus 107, on receiving an instruction related with the call from a communication terminal which is a receiver of the information, transmits the call to a suitable communication terminal to establish the call between the caller communication terminal and the suitable communication terminal.

The network to which the portable terminal 101, the telephone machine 102, the PC 103, the display 104, the camera 105, and the projector 106 can be connected is supposed to employ communication media of a same type whether it is wireless or fixed-line. Alternatively, the network may be structured to employ different communication media, if the communication control apparatus 107 is structured to enable the communication among different media provided in each communication terminal.

The internet 108 is supposed to be a wide-area network which anyone can use. However, the internet 108 may be a network such as an intra-company local area network (LAN).

Figure 2:
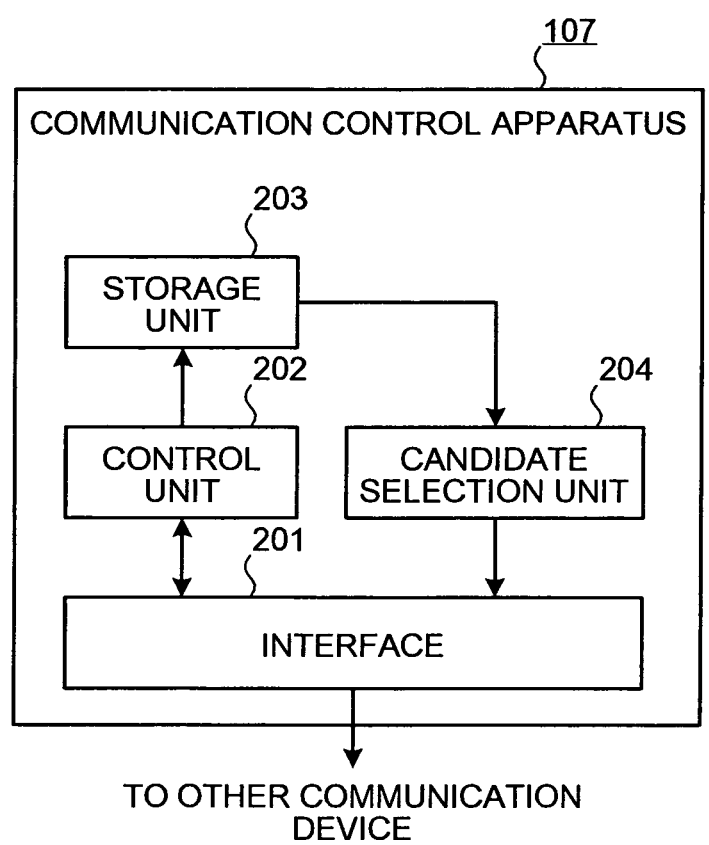
FIG. 2 is a block diagram of an example of a structure of a communication control apparatus according to the first embodiment.

FIG. 2 is a block diagram of an example of a structure of the communication control apparatus 107 according to the first embodiment. In FIG. 2, an interface 201, a control unit 202, a storage unit 203, and a candidate selection unit 204 are shown.

The interface 201 has a function to communicate with a communication terminal on the internet 108 or other communication terminal such as the portable terminal 101. As far as the interface 201 can communicate with the communication terminals, the interface 201 may employ any protocol and may be a wireless type or a fixed-line type.

The control unit 202 has a function of controlling an overall operation of the communication control apparatus 107. The control unit 202 receives a call and gives instructions to other devices, for example, via the interface 201.

The storage unit 203 has a function of storing terminal information about the communication terminal with which the connection may be established, such as the portable terminal 101, and the display 104. The terminal information stored in the storage unit 203 is previously set by the user. Preferably the storage unit 203 is structured so that the user can input information as appropriate from a high-performance terminal such as the PC 103 in a remote location via the network. Still preferably, each communication terminal is structured as to send own terminal information to the communication control apparatus 107 on power-on, and the control unit 202 receives the terminal information and automatically stores the same in the storage unit 203 without waiting for the instruction from the user, so that a setting of the terminal information is realized via the network.

The candidate selection unit 204 has a function of selecting a communication terminal as a candidate to be connected to the call according to a predetermined rule based on the terminal information stored in the storage unit 203. The terminal information of the selected candidate is sent to a predetermined communication terminal via the interface 201.

FIG. 3 shows an example of a terminal information table 301 stored in the storage unit 203 of the first embodiment. Items stored in the terminal information table are a communication device identifier, a user identifier, a media type, and an input/output (I/O) type. The communication device identifier is an address for the identification of each communication device at the communication, and is an IP address in a communication utilizing the Internet Protocol, for example. In the example shown in FIG. 3, the communication device identifiers 1, 2, 3, 4, 5, and 6 correspond with the portable terminal 101, the telephone machine 102, the PC 103, the display 104, the camera 105, and the projector 106, respectively.

The user identifier is a value for the identification of the user in the communication. For example, if the network to be utilized is a telephone line, the telephone number may be used as the user identifier. If the network uses Session Initiation Protocol (SIP), the user identifier may be SIP URI. When the user identifier is described in the table, it means that a corresponding communication terminal is used by the user identified by the user identifier. In the example of FIG. 3, the portable terminal 101 and the telephone machine 102 are used by a user A, whereas the PC 103 is used by a user B. When there is a need to ask instruction of a certain user, a transmission may be made to a communication terminal used by this certain user. In the shown example, assume that an instruction from the user A is needed. The user A is likely to respond if the transmission is made to the portable terminal 101 or the telephone machine 102. On the other hand, when the user identifier is shown as "Any," a corresponding communication terminal is a device shared by unspecified users.

In the box of media type, a data format which can be handled by a corresponding communication terminal is stored. In the example of FIG. 3, descriptions of audio X and video Y are provided. For example, a communication terminal with the communication device identifier 1 and only the description of audio X in the media type cannot process data format such as video Y other than audio X. The description of media type may include more detailed information, such as an employed coding format of the audio data or the video data.

The I/O type indicates whether a corresponding communication terminal can input/output the data indicated by the media type.

A connectable communication terminal is selected based on the user identifier, the media type, and the I/O type, as to satisfy the function requested by the call.

As an example 1, assume that a caller requests a voice call. For the voice call, mutual conversation must be allowed. Then, a communication terminal which is capable of input/output of audio X must be selected. In the example, communication terminals that satisfy these requirements are the portable terminal 101 (communication device identifier 1), the telephone machine 102 (communication device identifier 2), and the PC 103 (communication device identifier 3). When the call is made by the user A, adoptable communication terminals are the portable terminal 101 and the telephone machine 102. When the call is made by the user B, an adoptable communication terminal is the PC 103 alone. When the call is made by other user C, there is no communication terminal usable for the user C including the communication terminals with the user identifier "Any," and hence, there is no candidate terminal.

As an example 2, assume that a caller requests a TV telephone call. Then, the communication terminal must be capable of exchanging video data and audio data with other communication terminal. When combination of adoptable communication terminals is checked similarly to the example 1, the user A can adopt six combinations of communication terminals, i.e., the portable terminal 101 & the PC 103, the portable terminal 101 & the display 104 & the camera 105, the portable terminal 101 & the camera 105 & the projector 106, and three other combinations where the portable terminal 101 in above three combinations are replaced with the telephone machine 102. Hence five terminals are selected as the candidate communication terminals, i.e., the portable terminal 101, the telephone machine 102, the display 104, the camera 105, and the projector 106. For the user B, four candidate communication terminals, i.e., the PC 103, the display 104, the camera 105, and the projector 106 are selected.

As an example 3, assume that the caller requests presentation. Then, the communication terminal needs simply to display the video data. Hence, for the user A, two communication terminals, i.e., the display 104 and the projector 106 are selected, whereas for the user B, three communication terminals, i.e., the PC 103 besides above listed two terminals are selected as the candidate terminals.

Figure 4:
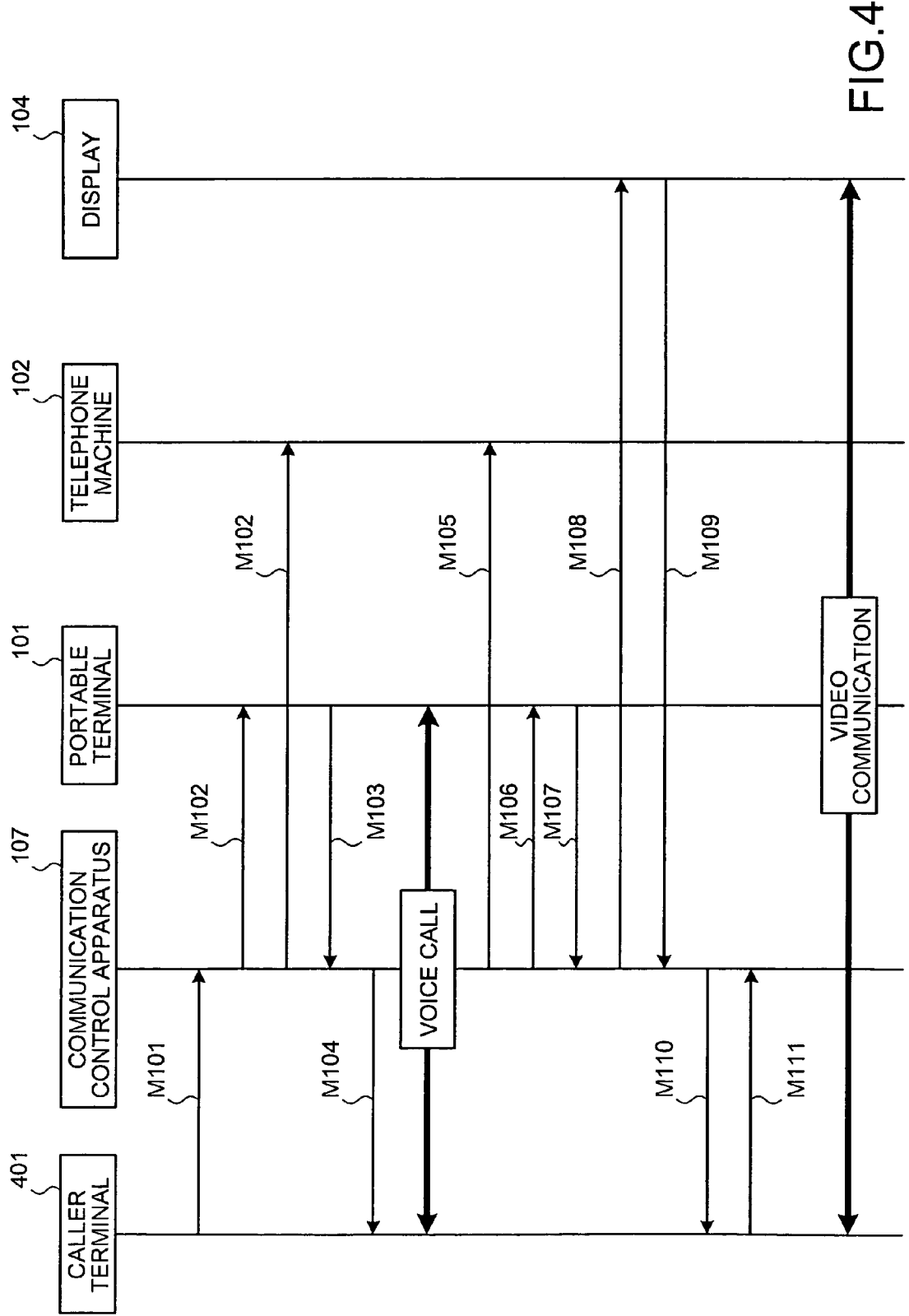
FIG. 4 is a diagram of an example of a sequence of a real-time communication system according to the first embodiment.

FIG. 4 is a diagram of an example of a sequence of the real-time communication system according to the first embodiment. The sequence is described below in turn.

First, a communication terminal makes a call with a connection request message M101. Hereinafter, the caller communication terminal is referred to as a caller terminal 401. The communication control apparatus 107 which receives the connection request message M101, selects a communication terminal to which the message should be sent based on the terminal information stored in the storage unit 203 and the content of the connection request message M101. The connection request message M101 includes at least the user identifier of the to-be-connected and the media type to be used. Here, assume that the user identifier indicates the user A, and the media type is audio X & video Y. The communication control apparatus 107 selects a communication terminal whose user identifier indicates the user A in the user information 301 and which is capable of handling the audio X. Then, the portable terminal 101 and the telephone machine 102 are selected as the adoptable communication terminals. The communication control apparatus 107 sends the connection request message M102 to the portable terminal 101 and the telephone machine 102 which are selected as the communication terminals to which the connection request message M101 should be sent. Here, the connection request message M102 may be sent to one terminal or plural terminals among the selected terminals. Alternatively, the connection request message may be sequentially sent to each terminal until a response to the connection request is obtained.

The portable terminal 101 or the telephone machine 102 receiving the connection request message M102 perform a predetermined operation, e.g., blinking a lamp or ringing a buzzer, to notify the reception of the message to the user (here, the user A).

The communication control apparatus 107, on receiving a response message M103 to the connection request from the portable terminal 101 which receives the connection request message M102, transfers a response message M104 to the connection request to the caller terminal 401. Here, the portable terminal 101 can handle data of the media type audio X alone. Hence a message notifying that the video Y cannot be handled by the portable terminal 101 is added to the response message M104 to the connection request and sent to the caller terminal 401. The addition of information notifying that a certain data cannot be handled may be performed by the portable terminal 101 or the communication control apparatus 107. Thus, the connection for the voice call is established between the caller terminal 401 and the portable terminal 101.

In response to the establishment of the connection for the voice call between the communication terminals, the communication control apparatus 107 sends a connection request cancel message M105 to other adoptable communication terminal (telephone machine 102 here) to which the connection request message M102 is sent but the response thereto has not been obtained.

Next, a communication terminal which can handle data of the media type: video Y is selected. The communication terminals which can be used by the user A and handle the video data are three terminals, i.e., the display 104, the camera 105, and the projector 106 according to the terminal information table 301. The communication control apparatus 107 sends a device list message M106 including terminal information of the three terminals to the portable terminal 101. Here, the communication terminal to which the device list message M106 is sent may be selected either from a communication terminal with which the voice call has already been established (here, the portable terminal 101) or from a communication terminal whose user identifier is the user A in the terminal information table 301. Alternatively, a communication terminal to process the device list message M106 may be selected separately from the communication terminal that processes a data of a predetermined media type.

Figure 5:
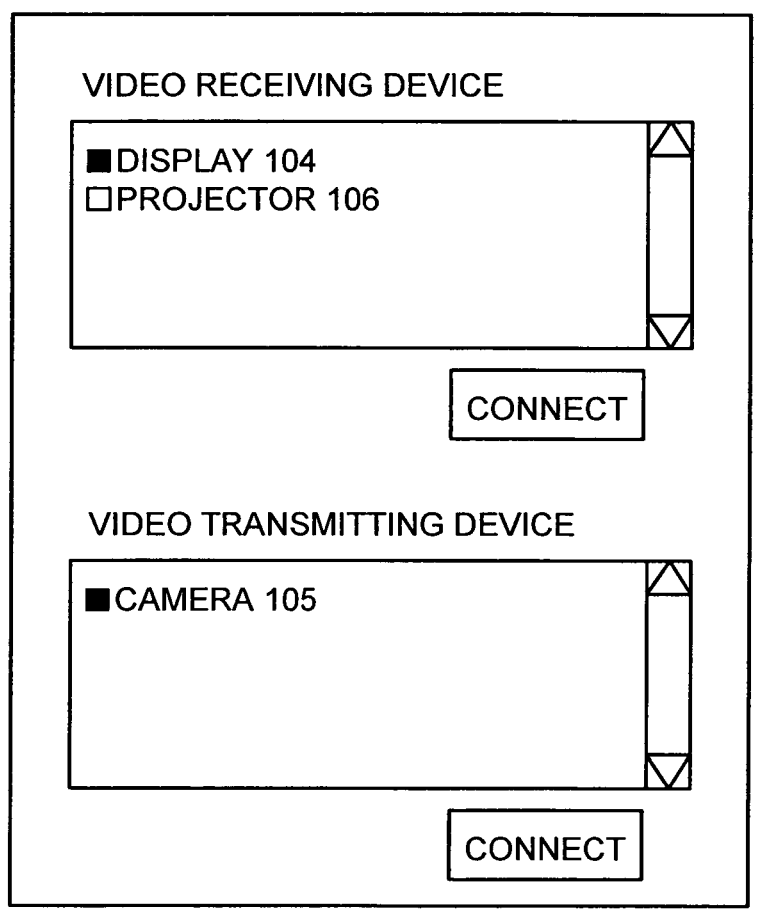
FIG. 5 is a diagram of an example of a screen to prompt selection according to the first embodiment.

The communication terminal (here, the portable terminal 101) that receives the device list message M106 displays a screen to prompt selection from the communication terminals included in the device list message M106. FIG. 5 is an example of the screen to prompt selection. In the example of FIG. 5, the user is prompted to select a device that receives video and a device that transmits video displayed separated on the screen. The user (here, the user A) checks a check box for the display 104 as the video receiving device, and a check box for the camera 105 as the transmitting device, and push a connection button, to instruct that the display 104 is selected for the output of video Y whereas the camera 105 is selected for the input of video Y. The instruction is transmitted from the portable terminal 101 to the communication control apparatus 107 as a device addition request message M107.

The communication control apparatus 107 sends a connection request message M108 for the media type: video Y to a communication terminal identified by the device addition request message M107 (for example, the projector 106). When the display 104 accepts the connection request message M108, the display 104 responds to the communication control apparatus 107 with a response message M109 to the connection request.

The communication control apparatus 107, on receiving the response message M109, sends an additional connection request message M110 to the caller terminal 401 to add the display 104 in the connection. The caller terminal 401 sends back a response message M111 to the additional-connection request in response to the additional connection request message M110.

Through the above-described process, a video communication is established between the caller terminal 401 and the display 104, and a series of calling process for the connection request message M101 made by the caller terminal 401 completes.

With such structure, the communication terminal(s) to be connected is selected from the candidate communication terminals selected according to the predetermined condition, whereby the selection of the communication terminal(s) to which the call should be connected can be simplified.

In a second embodiment, the terminal information managed by the terminal information table further includes information on a position dissimilar to the terminal information according to the first embodiment.

FIG. 6 is a diagram of an example of a structure of a real-time communication system according to the second embodiment. In FIG. 6, the portable terminal 101, the telephone machine 102, the PC 103, the display 104, the camera 105, the projector 106, the communication control apparatus 107, the internet 108, and a mobile telephone 601 are shown.

The mobile telephone 601 is connected to the communication control apparatus 107 via a network, and has a function of receiving/supplying audio data from/to other communication terminal via the network.

The other communication terminals are same with those shown according to the first embodiment.

FIG. 6 shows that though all communication terminals are connected to the communication control apparatus 107, the communication terminals are divided into two separate rooms A and B.

FIG. 2 is a block diagram of an example of a structure of the communication control apparatus 107 according to the second embodiment. In FIG. 2, the interface 201, the control unit 202, the storage unit 203, and the candidate selection unit 204 are shown. Each unit is same with that described according to the first embodiment.

FIG. 7 shows an example of a terminal information table 701 stored in the storage unit 203 according to the second embodiment. Stored items are the communication device identifier, the user identifier, the media type, the I/O type, and positional information.

The positional information indicates where the communication terminal is located. In the example of FIG. 7, an arrangement of respective communication terminals in two different rooms A and B is indicated by the positional information. The positional information of respective device is previously stored in the terminal information table 701 by the user, for example. Alternatively, information on location may be supplied to respective communication terminal at its installation, and the information may be sent to the communication control apparatus 107 via the network so that the information is stored in the terminal information table 701. Still alternatively, a radio frequency identification (RFID) tag embedded in respective communication terminal may be detected according to RFID technique, and the position of installation may be identified base on the position the RFID tag is detected.

A connectable communication terminal is selected based on the user identifier, the media type, the I/O type, and the positional information, so as to satisfy the function requested by the call.

In other respects the second embodiment is same with the first embodiment.

As an example 1, assume that a caller requests a voice call. For the voice call, mutual conversation must be allowed. Then, a communication terminal which is capable of input/output of audio X must be selected. In the example, communication terminals that satisfy these requirements are four terminals, i.e., the portable terminal 101 (communication device identifier 1), the telephone machine 102 (communication device identifier 2), the PC 103 (communication device identifier 3), and the mobile telephone 601 (communication device identifier 7). However, when the user A is in the room A, devices outside the room A cannot be used for the voice call, and hence should not be counted as the candidate terminals. Thus, the candidate terminals usable for the user A for the voice call are two terminals arranged in the room A, i.e., the portable terminal 101 and the telephone machine 102.

As an example 2, assume that a caller requests a TV telephone call. Then, the communication terminal must be capable of exchanging video data and audio data with other communication terminal. When combination of adoptable communication terminals is checked similarly to the example 1, the user A can adopt nine combinations of communication terminals, i.e., the portable terminal 101 & the PC 103, the portable terminal 101 & the display 104 & the camera 105, the portable terminal 101 & the camera 105 & the projector 106, and six other combinations where the portable terminal 101 in above three combinations are replaced with either the telephone machine 102 or the mobile telephone 601. However, similarly to the example 1, when the communication terminals outside the room A cannot be used for the TV telephone, there is no communication terminal which can receive the video data (e.g., the camera 105) in the room A. Then, if the counterpart terminal accepts an imperfect TV telephone where one terminal does not send its video to the counterpart, the connection for the TV telephone can be realized with the display 104 and one of the portable terminal 101 and the telephone machine 102. If such an imperfect TV telephone is accepted, the candidate terminals usable for the TV telephone are three terminals, i.e., the portable terminal 101, the telephone machine 102, and the display 104 arranged in the room A.

As an example 3, assume that the caller requests presentation. Then, the communication terminal needs simply to display the video data. Hence, for the user A, two communication terminals, i.e., the display 104 and the projector 106 are adoptable. However, if the user A is in the room A, only the display 104 is selected as the candidate terminal which is usable.

FIG. 4 is a diagram of an example of a sequence of the real-time communication system according to the second embodiment. The sequence in the second embodiment is similar to the sequence in the first embodiment.

With such a structure, the communication terminals are selected based on a limitation on use according to the arranged position and a predetermined condition as the candidate terminals, so that the terminals which can be candidate terminals are limited. Thus, the operation by the user to select the communication terminal to which the call is to be connected can be simplified.

According to a first modification of the second embodiment, information concerning a use condition is further added to the terminal information managed by the terminal information table of the second embodiment.

FIG. 8 is an example of a terminal information table 801 stored in the storage unit 203 according to the first modification of the second embodiment. Stored items are the communication device identifier, the user identifier, the media type, the I/O type, the positional information, and the use condition.

The use condition indicates a necessary condition for the use of respective communication terminal. For example, since the portable terminal 101 (the communication device identifier 1), the telephone machine 102 (the communication device identifier 2), the PC 103 (the communication device identifier 3) are exclusively owned by the respective users, these terminals cannot be shared by other user. The box of the use condition for the camera 105 (the communication device identifier 5) indicates that the camera must be used together with one of the display 104 (the communication device identifier 4) and the projector 106 (the communication device identifier 6). Even if a communication terminal is selected as a candidate terminal based on the media type, I/O type, and the positional information, when the use condition does not match, such communication terminal is eventually excluded from the candidate terminal.

With such a structure, the communication terminals are selected based on a limitation on use according to the distinctive combination of the communication terminals and a predetermined condition as the candidate terminals, so that the terminals which can be candidate terminals are limited. Thus, the operation by the user to select the communication terminal to which the call is to be connected can be simplified.

According to a second modification of the second embodiment, information on the state of use is further added to the terminal information managed by the terminal information table of the second embodiment.

FIG. 9 shows an example of a terminal information table 901 stored in the storage unit 203 according to the second modification of the second embodiment. Stored items are the communication device identifier, the user identifier, the media type, the I/O type, the positional information, and the user.

In the item "user", the user identifier of a user who is currently using the respective communication terminal is stored. For example, FIG. 9 indicates that the portable terminal 101 (the communication device identifier 1) and the telephone machine 102 (the communication device identifier 2) are under use by the user A, whereas the PC 103 (the communication device identifier 3), the camera 105 (the communication device identifier 5), and the projector 106 (the communication device identifier 6) are under the use by the user B. The description "available" in the "user" box indicates that the corresponding display 104 (the communication device identifier 4) and the mobile telephone 601 (the communication device identifier 7) are currently not used by anyone. Even if a communication terminal is selected based on the media type, the I/O type, and the positional information as the candidate terminal, if the device is under use, the communication terminal cannot be used for the call made by the caller terminal 401, and hence is not selected as the candidate terminal.

Whether a communication terminal is under use or not can be determined through monitoring of the start of the use which is defined as a time of the reception of the response message M103 to the connection request or the response message M109 to the connection request, for example. The end of the use may be detected based on the monitoring of disconnection of the connected call. Alternatively, respective communication terminals may be structured to separately send a notification of disconnection.

With such a structure, the communication terminals are selected based on a state of use of respective communication terminal and a predetermined condition as the candidate terminals, so that the terminals which can be candidate terminals are limited. Thus, the operation by the user to select the communication terminal to which the call is to be connected can be simplified.

According to a third embodiment, the communication control apparatus sends a notification of connection request to all the connectable communication terminals at a time of selection of communication terminal to be connected of the first embodiment, and directly selects a communication terminal to be connected therefrom.

FIG. 1 is a diagram of an example of a structure of a real-time communication system according to the third embodiment. The respective components of the real-time communication system are same with those according to the first embodiment.

FIG. 2 is a block diagram of an example of a structure of the communication control apparatus 107 according to the third embodiment. The respective components of the communication control apparatus 107 are same with those according to the first embodiment.

FIG. 3 is a diagram of an example of the terminal information table 301 stored in the storage unit 203 according to the third embodiment. The respective stored items are same with those according to the first embodiment.

FIG. 10 is a diagram of an example of a sequence of the real-time communication system according to the third embodiment. The sequence of the real-time communication system of the third embodiment is described below in turn.

First, a communication terminal makes a call with a connection request message M201. Hereinafter, the caller communication terminal is referred to as the caller terminal 401. The communication control apparatus 107 which receives the connection request message M201, selects a communication terminal to which the message should be sent based on the terminal information stored in the storage unit 203 and the content of the connection request message M201. The connection request message M201 includes at least the user identifier of the terminal to be connected and the media type to be used. Here, assume that the user identifier is the user B, and the media type is audio X & video Y. For the simplification of the description, it is assumed in the third embodiment that the PC 103 can handle only audio X, and the data of video Y is image data to be displayed to the user. The communication control apparatus 107 selects a communication terminal whose user identifier is the user B in the user information 301 and which is capable of handling the audio X. Then, the PC 103 is selected as the adoptable communication terminal. The communication control apparatus 107 sends a connection request message M202 to the PC 103 which is selected as the communication terminal to which the connection request message M201 should be sent.

The PC 103 on receiving the connection request message M202 performs a predetermined operation, e.g., blinking a lamp or ringing a buzzer, to notify the reception of the message to the user (here, the user B).

The communication control apparatus 107, on receiving a response message M203 to the connection request from the PC 103 which receives the connection request message M202, transfers a response message M204 to the connection request to the caller terminal 401. Here, if the PC 103 cannot handle video Y in the media type for some reasons, a message notifying that the video Y cannot be handled is added to the response message M204 to the connection request sent to the caller terminal 401. The addition of information notifying that a certain data cannot be handled may be performed by the PC 103 or the communication control apparatus 107. Thus, the connection for the voice call is established between the caller terminal 401 and the PC 103.

Next, a communication terminal which can handle data of media type: video Y is selected. The communication terminals which can be used by the user B and display the video data are two terminals, i.e., the display 104 and the projector 106 according to the terminal information table 301. The communication control apparatus 107 sends a connection request message M205 to the two terminals. Here, the message sent by the communication control apparatus 107 to the two communication terminals may not be the connection request message sent from the caller terminal 401. As far as the message can notify that there is a call to a pertinent communication terminal, a new message may be generated for this purpose and used.

The communication terminals (here, the display 104 and the projector 106) that receive the connection request message M205 notify the user B that there is a call thereto by blinking a lamp or ringing a buzzer. The display 104 or the projector 106 is provided with a button or a remote controller to allow the user B to manipulate the terminal. The user B manipulates the button or the remote controller of the communication terminal which the user B wants to use among the plural communication terminals that notify the call, and indicates that the selection is made. Here, when the user B selects the display 104, the display 104 sends a response message M206 to the connection request to the communication control apparatus 107. Then, since the projector 106 is not selected, the communication control apparatus 107 sends a connection request cancel message M207 to the projector 106.

Then, the communication control apparatus 107 sends an additional connection request message M208 to the caller terminal 401 to add the display 104 in the call. The caller terminal 401 sends back a response message M209 to the additional connection request in response to the additional connection request message M208.

Through the above-described process, the video communication is established between the caller terminal 401 and the display 104, and a series of calling process for the connection request message M201 made by the caller terminal 401 completes.

With such structure, the communication terminal to be connected is selected from the candidate communication terminals selected according to the predetermined condition, and selected candidate communication terminal is notified of the selection, and the user can directly select the connected communication terminal from the candidates, whereby an operation for the selection of the communication terminal to which the call should be connected from a group of connectable communication terminals can be simplified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication control apparatus comprising:
a storing unit that stores terminal information including identifiers of a plurality of communication terminals, user identifiers corresponding to users of the communication terminals, an input/output type indicating whether the communication terminals are input terminals or output terminals or both, a use condition indicating whether each of the communication terminal is shared by others users, and media types for the communication terminals, the media types indicating data formats processed by the communication terminals;
a control unit configured to control the communication control apparatus to store the terminal information in the storing unit without waiting for an instruction from a user associated with the terminal information when power supply of a communication terminal associated with the terminal information turns on;

a selecting unit coupled to the storing unit and configured to select from the storing unit one or more of the communication terminals that satisfy a connection request received from a caller communication terminal, the connection request including a requested user identifier and a requested media type, the communication terminals being selected based on the use condition included in the terminal information and a result of comparing the media type comprising the connection request with the media types comprising the terminal information and the input/output type included in the terminal information; and a communication unit configured to:

transmit information identifying the selected communication terminals to a first one of the communication terminals, and to receive, from the first communication terminal, information identifying one of the selected communication terminals to be connected with the caller communication terminal, transmit the connection request to the identified communication terminal, and request the caller communication terminal to connect to the identified communication terminal.

2. The communication control apparatus according to claim 1, wherein the terminal information includes positional information which indicates where the communication terminals are located.

3. The communication control apparatus according to claim 1, wherein the terminal information includes user information which indicates users that are using the communication terminals.

4. The communication control apparatus according to claim 1, wherein the media type indicates audio or video.

5. A communication control apparatus comprising:

a storing unit that stores terminal information including identifiers of a plurality of communication terminals, user identifiers corresponding to users of the communication terminals, an input/output type indicating whether the communication terminals are input terminals or output terminals or both, a use condition indicating whether each of the communication terminals is shared by others users, and media types for the communication terminals, the media types indicating data formats processed by the communication terminals;

a control unit configured to control the communication control apparatus to store the terminal information in the storing unit without waiting for an instruction from a user associated with the terminal information when power supply of a communication terminal associated with the terminal information turns on;

a selecting unit coupled to the storing unit that selects from the storing unit one or more of the communication terminals that satisfy a connection request received from a caller communication terminal, the connection request including a requested user identifier and a requested media type, the communication terminals being selected based on the use condition in the terminal information and a result of comparing the media type comprising the connection request with the media types comprising the terminal information and the input/output type included in the terminal information; and a communication unit that:

transmits the connection request to the selected communication terminals, and receives a response from a first one of the selected communication terminals, and requests the caller communication terminal to connect to the first communication terminal.

6. The communication control apparatus according to claim 5, wherein the terminal information includes user information which indicates users that are using the communication terminals.

7. The communication control apparatus according to claim 5, wherein the media type indicates audio or video.

8. A communication control method comprising:

storing terminal information in a storing unit including identifiers of a plurality of communication terminals, user identifiers corresponding to users of the communication terminals, an input/output type indicating whether the communication terminals are input terminals or output terminals, a use condition indicating, whether each of the communication terminals is shared y other users, and media types for the communication terminals, the media types indicating data formats processed by the communication terminals;

controlling a communication control apparatus to store the terminal information in the storing unit without waiting for an instruction from a user associated with the terminal information when power supply of a communication terminal associated with the terminal information turns on;

selecting from the storing unit one or more communication terminals that satisfy a connection request received from a caller communication terminal, the connection request including a requested user identifier and a requested media type, the communication terminals being selected based on the use condition included in the terminal information and a result of comparing the media type comprising the connection request with the media types comprising the terminal information and the input/output type included in the terminal information;

transmitting information identifying the selected communication terminal to a first one of the communication terminals;

receiving information identifying one of the selected communication terminals to be connected with the caller communication terminal;

transmitting the connection request to the identified communication terminal; and requesting the caller communication terminal to connect to the identified communication terminal.

\* \* \* \* \*